US008250102B2

(12) United States Patent
Madhavarapu et al.

(10) Patent No.: US 8,250,102 B2
(45) Date of Patent: Aug. 21, 2012

(54) REMOTE STORAGE AND MANAGEMENT OF BINARY OBJECT DATA

(75) Inventors: Pradeep Jnana Madhavarapu, Kirkland, WA (US); Rohan Kumar, Redmond, WA (US); Michael J Warmington, Redmond, WA (US); Kevin G. Farlee, Maple Valley, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 12/048,753

(22) Filed: Mar. 14, 2008

(65) Prior Publication Data

US 2009/0234880 A1    Sep. 17, 2009

(51) Int. Cl.
*G06F 7/00* (2006.01)

(52) U.S. Cl. ........ 707/792; 707/793; 707/794; 707/795; 707/796

(58) Field of Classification Search .................. None
See application file for complete search history.

(56) References Cited

U.S. PATENT DOCUMENTS

| | | | |
|---|---|---|---|
| 5,920,860 A | 7/1999 | Maheshwari et al. | |
| 6,061,678 A | 5/2000 | Klein et al. | |
| 6,078,920 A * | 6/2000 | Tan et al. | 1/1 |
| 6,105,017 A | 8/2000 | Kleewein et al. | |
| 6,243,718 B1 * | 6/2001 | Klein et al. | 1/1 |
| 6,584,459 B1 | 6/2003 | Chang et al. | |
| 6,615,219 B1 * | 9/2003 | Bruso et al. | 707/699 |
| 7,200,620 B2 | 4/2007 | Gupta | |
| 7,222,131 B1 * | 5/2007 | Grewal et al. | 717/168 |
| 2005/0289218 A1 | 12/2005 | Rothman et al. | |
| 2006/0279772 A1 * | 12/2006 | Ludwig et al. | 358/1.15 |
| 2007/0282806 A1 | 12/2007 | Hoffman et al. | |
| 2008/0091698 A1 * | 4/2008 | Cook et al. | 707/101 |

OTHER PUBLICATIONS

Managing Unstructured Data with SQL Server 2008 (11pages) http://download.microsoft.com/download/a/c/d/acd8e043-d69b-4f09-bc9e 4168b65aaa71/SQL2008UnstructuredData.doc.
A Distributed Scientific Data Archive Using the Web, XML and SQL/MED (7 pages) http://www.sigmod.org/sigmod/record/issues/9909/papiani.ps.
Design and Performance of an Object-Oriented Framework for High-Speed Electronic Medical Imaging (19 pages) http://www.cs.wustl.edu/—schmidt/PDF/COOTS-96.pdf.

* cited by examiner

*Primary Examiner* — Fred I Ehichioya
*Assistant Examiner* — Anh Tai Tran
(74) *Attorney, Agent, or Firm* — Workman Nydegger (57) ABSTRACT

Embodiments described herein are directed to the accessing remotely stored binary object data in a binary object store. In one embodiment, a computer system receives a request for a portion of binary object data, sends a query to a database server requesting access to the binary object data, and receives a binary object reference. The binary object reference includes binary object identification data and use characteristics specific to the binary object store. The computer system sends a binary object data access request based on the binary object reference to the binary object store using a binary object store interface, and receives the binary object data corresponding to the binary object data access request. The binary object data comprises a portion of data files. The computer system also sends the received binary object data to the user.

14 Claims, 5 Drawing Sheets

REMOTE STORAGE AND MANAGEMENT OF BINARY OBJECT DATA

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email In many cases, software applications are designed to interact with other computer systems. For example, internet browser applications are designed to communicate with web servers, uploading and downloading information as requested by the end-user. Many times, information accessible by software applications is stored on a database server. Database servers are typically high-end computer systems with fast data access times and transfer speeds. In some cases, database servers serve many thousands of end-users simultaneously. This can lead to heavy processing loads and slower data transfer rates. Because database servers are built to handle such loads, they often cost more and are more difficult to maintain than conventional computer storage and data access systems.

BRIEF SUMMARY

Embodiments described herein are directed to the accessing remotely stored binary object data in a binary object store. In one embodiment, a computer system receives a request for a portion of binary object data, sends a query to a database server requesting access to the binary object data, and receives a binary object reference. The binary object reference includes binary object identification data and use characteristics specific to the binary object store. The computer system sends a binary object data access request based on the binary object reference to the binary object store using a binary object store interface, and receives the binary object data corresponding to the binary object data access request. The binary object data comprises a portion of data files. The computer system also sends the received binary object data to the user.

In an alternative embodiment, a computer system accesses a binary object pool comprising a plurality of binary object data portions stored in a binary object store and accesses a binary object reference table including binary object references associated with one or more binary object data portions stored in the binary object store. The binary object references are usable by applications to access the binary object data portions referenced in the binary object reference table. The computer system determines that at least one of the binary object references in the binary object reference table has changed and, based on the determination, performs various operations to the binary object data portions corresponding to the changes in the binary object references.

In yet another alternative embodiment, a computer system receives at an application server a request for a portion of blob data, sends a query to a database server requesting access to the blob data, and receives a blob reference. The blob reference includes blob identification data and use characteristics specific to the blob store. The computer system passes the received blob reference to a client communication interface configured to communicate with a blob store interface and further passes the blob reference from the client communication interface to the blob store interface. The blob store interface is configured to interpret blob references and request blob data from the blob store according to the use characteristics of the blob store. The computer system also sends a blob data access request based on the identification data in the blob reference using the blob store interface and receives the blob data corresponding to the blob data access request at the blob store interface. The blob data comprises a portion of one or more data files. The computer system passes the received blob data from the blob store interface to the client communication interface, passing the received blob data to the application server, and sends the received blob data to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to the accessing remotely stored binary object data in a binary object store. In one embodiment, a computer system receives a request for a portion of binary object data, sends a query to a database server requesting access to the binary object data, and receives a binary object reference. The binary object reference includes binary object identification data and use characteristics specific to the binary object store. The computer system sends a binary object data access request based on the binary object reference to the binary object store using a binary object store interface, and receives the binary object data corresponding to the binary object data access request. The binary object data comprises a portion of data files. The computer system also sends the received binary object data to the user.

In an alternative embodiment, a computer system accesses a binary object pool comprising a plurality of binary object data portions stored in a binary object store and accesses a binary object reference table including binary object references associated with one or more binary object data portions stored in the binary object store. The binary object references are usable by applications to access the binary object data portions referenced in the binary object reference table. The computer system determines that at least one of the binary object references in the binary object reference table has changed and, based on the determination, updates the binary object data portions corresponding to the changes in the binary object references.

In yet another alternative embodiment, a computer system receives at an application server a request for a portion of blob data, sends a query to a database server requesting access to the blob data, and receives a blob reference. The blob reference includes blob identification data and use characteristics specific to the blob store. The computer system passes the received blob reference to a client communication interface configured to communicate with a blob store interface and further passes the blob reference from the client communication interface to the blob store interface. The blob store interface is configured to interpret blob references and request blob data from the blob store according to the use characteristics of the blob store. The computer system also sends a blob data access request based on the identification data in the blob reference using the blob store interface and receives the blob data corresponding to the blob data access request at the blob store interface. The blob data comprises a portion of one or more data files. The computer system passes the received blob data from the blob store interface to the client communication interface, passing the received blob data to the application server, and sends the received blob data to the user.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
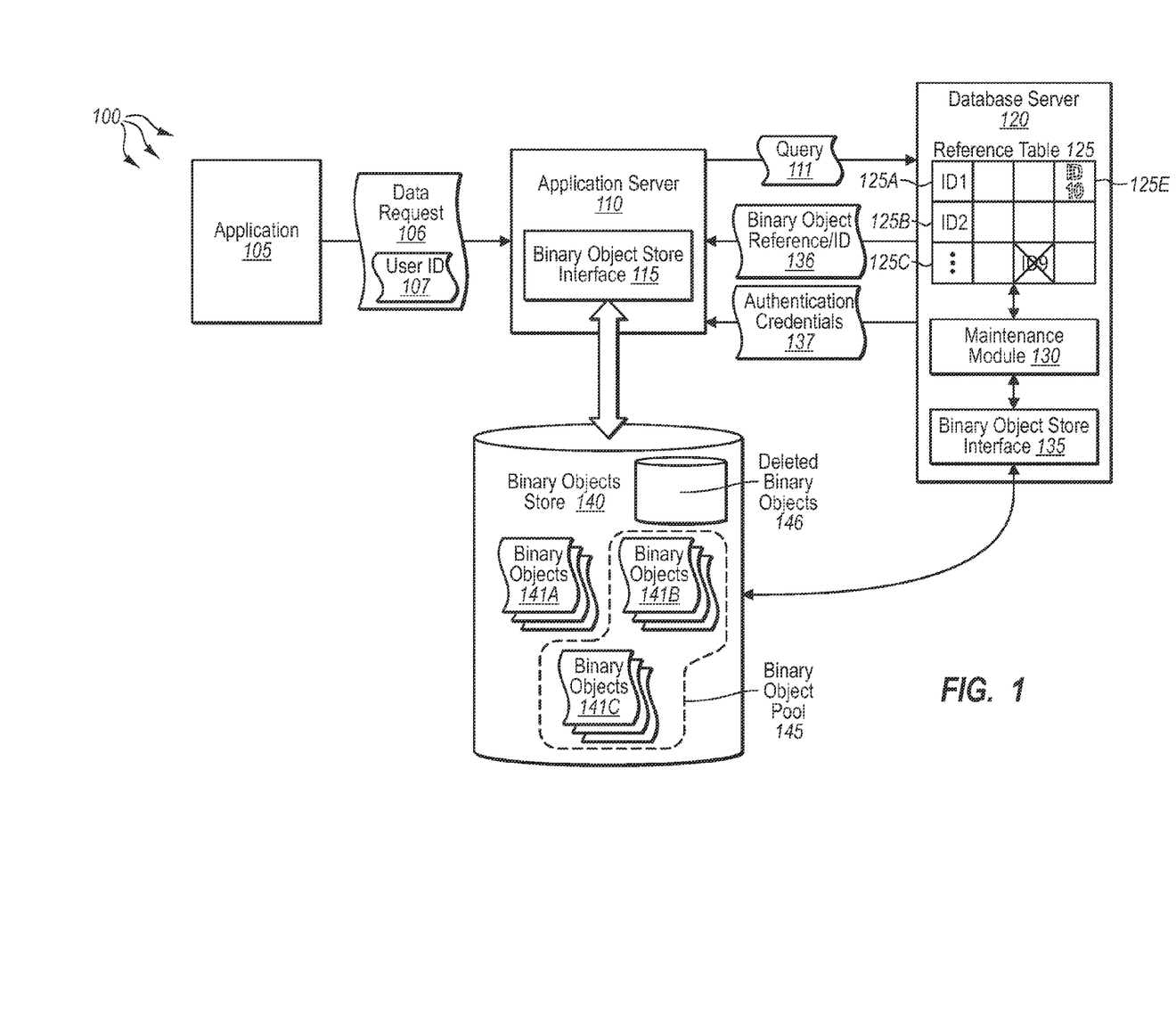
FIG. 1 illustrates a computer architecture in which embodiments of the present invention may operate including accessing remotely stored binary object data in a binary object store.

FIG. 1 illustrates a computer architecture 100 in which the principles of the present invention may be employed. Computer architecture 100 includes application 105. Application 105 may be any type of software application and may be run on any type of computer system. Application 105 may be configured to communicate with application server 110. In some cases, application server 110 may actually process and serve application 105 to an end-user. In other cases, application 105 may run independent from server 110. Application 105 may send information to application server 110 including data request 106 and user identification (ID) 107. Data request 106 may include a request for some type of information related to application 105. User ID 107 may include information identifying one or more end-users using application 105. The ID may be used for authentication purposes, as will be explained in greater detail below.

Application server 110 may send a query 111 to database server 120 based on received data request 106. For example, in some cases, application server 110 may not have the information requested by an end-user, and may request the information from another computer system. Database server 120 may be configured to store information including data files and metadata corresponding to the data files. Data server 120 may also include a reference table 125 that maintains a list of data file ID's including ID1 (125A), ID2 (125B), and so on (125C). Crossed out ID9 (125D) may indicate a file ID that has been deleted or is to be deleted in the future. Dotted-line ID10 (125E) may indicate a file ID that has been temporarily assigned while a file is being created, and that may become permanent when the file has actually been created. Database server 120 may include maintenance module 130 which is configured to communicate with (including reading and writing to) reference table 125.

In some cases, reference table 125 may be referred as an application table. This may come as a result of application 105 being configured to use, manage, update or otherwise interact with (or own) reference table 125. In some embodiments, binary object ID 136 may be stored in an application table. That object ID may be used by maintenance module 130 to maintain data consistency in binary object store 140. Binary object store interface 135, which may be similar to or the same as binary object store interface 115, may be configured to facilitate communication between maintenance module 130 (and/or database server 120) and binary object store 140.

In some cases, maintenance module 130 may reside on database server 120. In other cases, maintenance module 130 may reside on another computer system that communicates with database server 120. Additionally or alternatively, there may be multiple instances of maintenance module 130 performing maintenance for the same database server (e.g. database server 120).

In some cases, binary object store 140 may include data storage components. Such components may include magnetic, optical, or other storage components. In some embodiments, multiple binary object stores of the same or different types may be used with database server 120. Binary object store components may be configured to store binary objects 141A, 141B, 141C and others. Binary objects, as used herein, include data files, binaries, or any other type of binary data. Binary objects may include media files (videos, audio, games), word processing documents, spreadsheets, application files or any other types of information. In some cases, binary objects may refer to binary large objects (blobs). Blobs may be immutable, indicating that once a blob is stored on the blob store, its data cannot be changed.

Binary object pool 145 may include an arbitrary, customizable number of binary objects and may be separated physically (i.e. on different storage components) or virtually using various software identifiers. In some cases, binary object store 140 may include a proprietary storage solution including network storage, remote storage, distributed storage or other storage setups. In such cases, binary object store interface 115/135 may be configured to facilitate communication between database server 120/application server 110 and binary object store 140. Binary object store 140 may also have a separate (physically or virtually) storage module 146 for storing deleted binary objects.

In response to query 111, database server may be configured to return binary object reference or binary object ID 136 to application server 110. In some cases, binary object reference 136 may include both a binary object ID and an identifier specific to the type of binary object store being used. In other cases, database server may only send a binary object ID, in which cases, application server 110 may later send another request for an identifier specific to the type of binary object store being used. Such provider-specific ID information may be stored in auxiliary tables on database 120, or as a part of reference table 125. Authentication credentials 137 may also be sent to application server 110 which may be used to authenticate to binary object store 140. These concepts will be explained in greater detail below, with reference to methods 200, 300 and 400 of FIGS. 2, 3 and 4, respectively.

Figure 2:
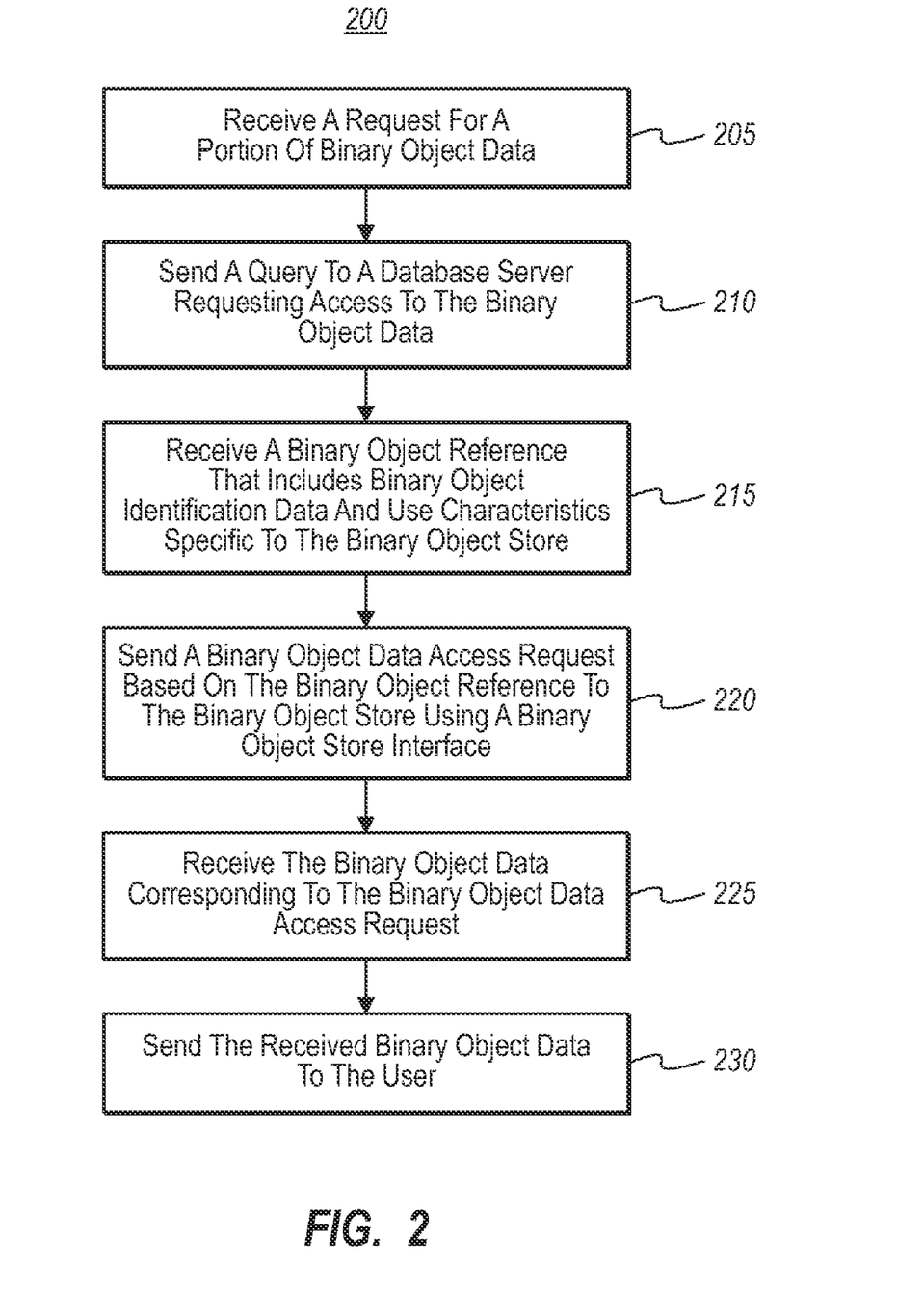
FIG. 2 illustrates a flowchart of an example method for accessing remotely stored binary object data in a binary object store.

FIG. 2 illustrates a flowchart of a method 200 for accessing remotely stored binary object data in a binary object store. The method 200 will now be described with frequent reference to the components and data of environment 100.

Method 200 includes an act of receiving a request for a portion of binary object data (act 210). For example, application server 110 may receive data request 106. Data request may include a request for information accessible on or using database server 120. In some cases, data request 106 may include a request for a plurality of binary objects in the same request.

In some embodiments, binary objects may be stored separately from their corresponding binary identification data. For example, in some cases, it may be desirable to store only a reference to a file or metadata regarding a file on a database server and store the main portion of the file on a separate storage system. In some cases, this may be more efficient as the database server may devote more time and resources to processing data requests and less time accessing the main portions of the data files. For example, application server 10 may initially determine that a data file is to be stored on database server 120. The file may include a portion of binary object data and a portion of associated metadata. Either application server 110 or database server 120 may separate the binary object data from the portion of associated metadata, and store the binary object data in a binary object store (e.g. store 140). The binary object data is linked to the associated metadata stored on the database server. Thus, database server 120 may store the references to binary objects (e.g. ID1 125A), while binary object store 140 stores a large portion of the actual binary data of the data file. This allows the storage to be attached, detached, replaced with another store, enabled, disabled, configured and deployed on-the-fly, independent of the database server.

Method 200 includes an act of sending a query to a database server requesting access to the binary object data (act 220). For example, application server 110 may send query 111 to database server 120 requesting access to binary object 141A. Database server 120 may be configured to look up the identity and location of the requested binary object and return the corresponding binary object reference 136 to application server 110.

Method 200 includes an act of receiving a binary object reference, the binary object reference including binary object identification data and zero or more use characteristics specific to the binary object store (act 230). For example, application server 10 may receive binary object reference 136, where reference 136 includes binary object identification data and various use characteristics specific to binary object store 140. As mentioned above, binary object store 140 may include a proprietary storage solution with specific data access protocols and other specific use characteristics. Database server 120 may either be programmed to know these use characteristics or may communicate directly with binary object store 140 to determine the use characteristics. Such use characteristics may be stored in auxiliary tables on database 120 and may be used by binary object store interface 115/135 to communicate with binary object store 140.

In some embodiments, binary object store 140 may include a plurality of different stores. Each store may be of the same or different type. For example, one store may be a certain brand or model, and another may be a different brand and/or model. Each brand and model may have different use characteristics including data storage format and data access protocols. In some embodiments, binary objects may be stored in one or more of a variety of binary object stores of varying store types. This may be done without making any changes to application 105. As mentioned above, binary object store 140 may communicate directly with database 120 using the use characteristics specific to the binary object store type.

In some cases, database server 120 may send a binary object ID 136 without the aforementioned use characteristics. In such cases, either application server 110 or binary object store interface may send a second request to database server 120 for an ID that is specific to the binary object store 140. This specific ID may be received from database server 120 at application server 10. In other embodiments, application serve 110 may receive binary object locator information. Binary object locator information includes location information that allows an application server in a multi application server environment to access and receive binary object data directly from the binary object store.

For example, if application 105 implemented a web front end server to handle internet requests for various files, a binary object locator may be used that allows application server 110 to receive a binary object locator from the database server 120 and pass it to the web front end. The web front end can then access the binary object data using the information of the object locator. In such cases, binary objects may flow directly to the web front end, bypassing application server 110. In some embodiments, an extensible markup language (XML) fragment may be used which includes all the information necessary to access a binary object in binary object store 140.

Method 200 includes an act of sending a binary object data access request based on the binary object reference to the binary object store using a binary object store interface (act 240). For example, application server 110 may send a binary object data access request based on binary object reference 136 to binary object store 140 using binary object store interface 115. As explained above, binary object store interface 115 may be configured to interpret use characteristics sent from database server 120 and use that information to communicate with binary object store 140. In some cases, it may be desirable to implement security procedures that prevent unauthorized users from accessing binary objects 141A-C in binary store 140.

In one security scheme, application server 110 may receive user ID 107 from an end-user and pass that ID to database server 120. Database server may use ID 107 to determine whether the user is authorized to access a requested file. Once it is determined that the user is authorized, database server 120 may send authentication credentials 137 corresponding to the user to application server 10. These credentials may be integrated with received binary object reference 136 into a software object. The software object may be used by binary object store interface 115 to access the requested binary object stored in store 140. In some cases, the binary object data is accessible by database server 120 using authentication credentials 137 and identification data in binary object reference 136.

Some embodiments may employ one or a combination of authentication or other security measures. In some cases, where an end-user is accessing application 105 using an operating system that provides a user login, the same user login information may be used to authenticate to either or both of the database server 120 and the binary object store 140. In other cases, application server 10 may implement a user authentication scheme that is configured to pass the user's credentials to either or both of database server 120 and store 140. Furthermore, database server 120 may have its own authentication scheme, whereby user credentials such as passwords, security keys, tokens or other credentials are used to authenticate the user to the database. Such database credentials may be passed automatically to binary object store 140 to allow the user access to at least the requested binary objects.

Method 200 includes an act of receiving the binary object data corresponding to the binary object data access request, the binary object data comprising a portion of one or more data files (act 250). For example, application server 110 may receive binary object data (e.g. 141A, 141B, and/or 141C) corresponding to the binary object data access request. As mentioned above, binary object data 141A-C may represent data files or portions of data files. The files may be large or small in size and may be stored in any manner, including proprietary storage formats.

Method 200 includes an act of sending the received binary object data to the user (act 260). For example, application server 110 may send the received binary object data (e.g. 141A) to an end-user using application 105. In this manner, a user may request information; the information may be referenced on a database server, accessed in a binary object store, and returned to the user in a timely and efficient manner.

Figure 3:
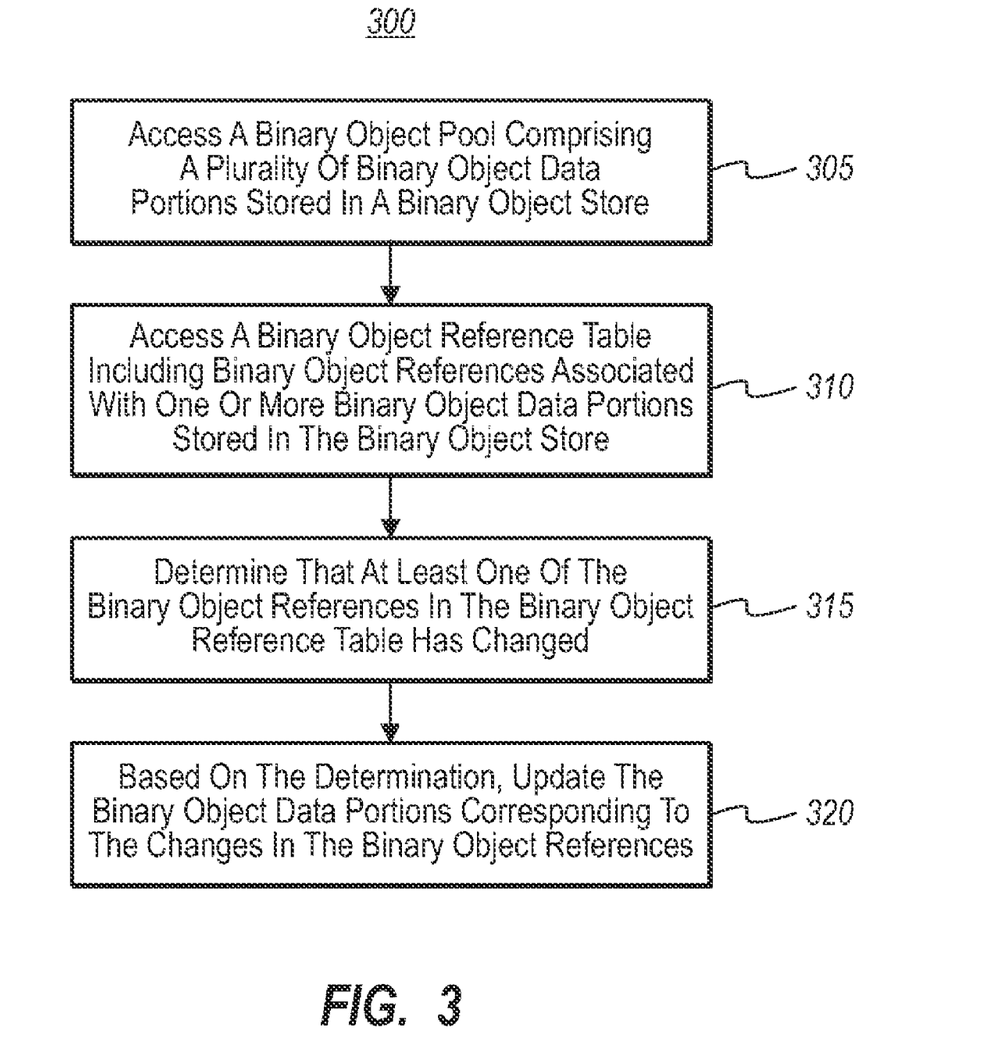
FIG. 3 illustrates a flowchart of an example method for maintaining consistency among a database server and a binary object store.

FIG. 3 illustrates a flowchart of a method 300 for maintaining consistency among a database server and a binary object store. As will be appreciated, it may be beneficial in a database environment to implement measures that ensure the consistency of data between a database server and a binary object store. The method 300 will now be described with frequent reference to the components and data of environment 100.

Method 300 includes an act of accessing a binary object pool comprising a plurality of binary object data portions stored in a binary object store (act 310). For example, application server 110 may access binary object pool 145 that includes a plurality of binary object data portions (e.g. 141B and 141C) stored in binary object store 140. In some cases, especially where there are thousands or even millions of binary objects stored in store 140, it may be advantageous to divide the binary objects into pools or groups for easier processing and more efficient management.

Method 300 includes an act of accessing a binary object reference table including binary object references associated with one or more binary object data portions stored in the binary object store, the binary object references being usable by one or more applications to access the binary object data portions referenced in the binary object reference table (act 320). For example, application server 110 may access binary object reference table 125 that includes binary object references (e.g. 125A-E) associated with various binary object data portions (e.g. 141A-C) stored in binary object store 140. The binary object references may be usable by applications (e.g. applications provided by application server 110) to access binary object data portions referenced in reference table 125. For instance, if ID1 (125A) corresponds to binary object 141A, a reference to ID1 may be used to access binary object 141A.

Method 300 includes an act of determining that at least one of the binary object references in the binary object reference table has changed (act 330). For example, application server 10 and/or database server 120 may determine that binary object reference ID9 (125D) has changed. For example, as shown in FIG. 1, ID9 appears to be crossed out, signifying that either the ID itself or the binary object(s) associated with that ID have been or are scheduled to be deleted. Other changes may include modifications, updates, creation, moving or any other alterations to the data. Other indications, such as an indication that data is out-of-date, may also be used to determine that references in reference table 125 should be updated. In some embodiments, binary objects are immutable, and thus, any changes made result in deletion of the original and replacement with a new object reflecting the changes. As binary object references are added to reference table 125, the references may be virtually created (e.g. ID 10 (125E)) before the data is committed to the database. In this manner, all the usual atomicity, consistency, isolation and durability (ACID) guarantees associated with a database are maintained across database server 120 and as binary object store 140.

In some cases, asynchronous checks may be performed to determine that at m least one of the binary object references 125A-E in the binary object reference table has changed. For example, checks may be performed at any time and for any length of time. For instance, in cases where such checks extend for long periods of time (often multiple hours), the check may begin and end immediately, and may be continued at a later time. Furthermore, binary object pools of varying sizes may be used to regulate the amount of time used to check the reference table 125 for changes. In some cases, any of maintenance module 130, database server 120 and application server 110 may automatically initiate update checks based on information from binary object store interfaces 115 and 135 indicating that the interface has been used to implement changes to binary object store 140. Multiple binary object pools may be updated simultaneously.

Method 300 includes, based on the determination, an act of updating the binary object data portions corresponding to the changes in the binary object references (act 340). For example, maintenance module 130 may, based on the determination that one or more binary objects have changed, initiate an update on binary store 140 that modifies the affected binary object data according to the changes indicated in the binary object references. In some cases, application server 110 may be responsible for indicating to maintenance module 130 that one or more binary objects are to be updated, based on the determination that one or more binary objects have changed. Thus, where reference table 125 indicates that an ID has been deleted, the corresponding binary object will be deleted or scheduled for deletion. Similarly, when a binary object has changed, or is in the process of being changed, database server 120 may be notified of the change and alter the reference table accordingly. In some embodiments, binary objects may only be deleted when the time for restoring backups based on that version of the binary object has expired.

In some cases, a situation may arise where a reference no longer matches up with a binary object. For example, the database server 120 may crash or otherwise become unavailable while it is being updated. Then, any changes made to binary objects in store 140 during that time may not be recorded, resulting in binary objects without corresponding references. Such objects are commonly referred to as orphans. Maintenance module 130 may be configured to perform checks that evaluate all of the existing references and all of the existing binary objects (in the entire store, or in a designated pool) and determine whether any differences or idiosyncrasies exist. Where differences exist, maintenance module 130 may communicate with binary object store 140 using binary object store interface 130 to ensure that reference table 125 stays up-to-date. It should be noted that although maintenance module 130 and binary object store interface 135 are shown in FIG. 1 as being part of database server 120, each may be part of another computer system including application server 110 or another system.

Some embodiments may allow a trigger to be associated with a binary object reference, such that when a binary object reference is changed, a notification is automatically sent to either or both of application server 110 and database server 120 indicating that the binary object is to be removed from binary object store 140. Such triggers may be fully customizable to indicate how and when the notification is sent and to whom the notification is sent. As such, triggers may aid in maintaining data consistency between application server 110, database server 120 and binary object store 140.

Figure 4:
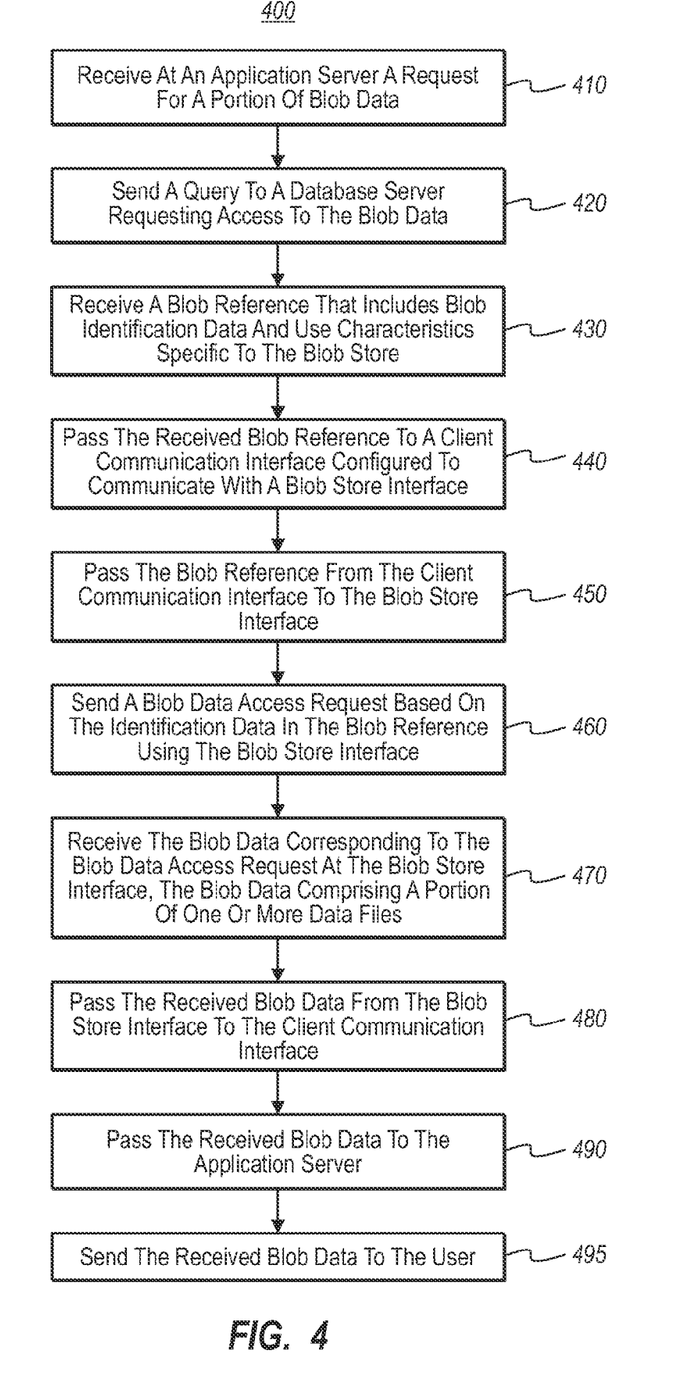
FIG. 4 illustrates a flowchart of an alternative example method for accessing remotely stored blob data in a blob store.
Figure 5:
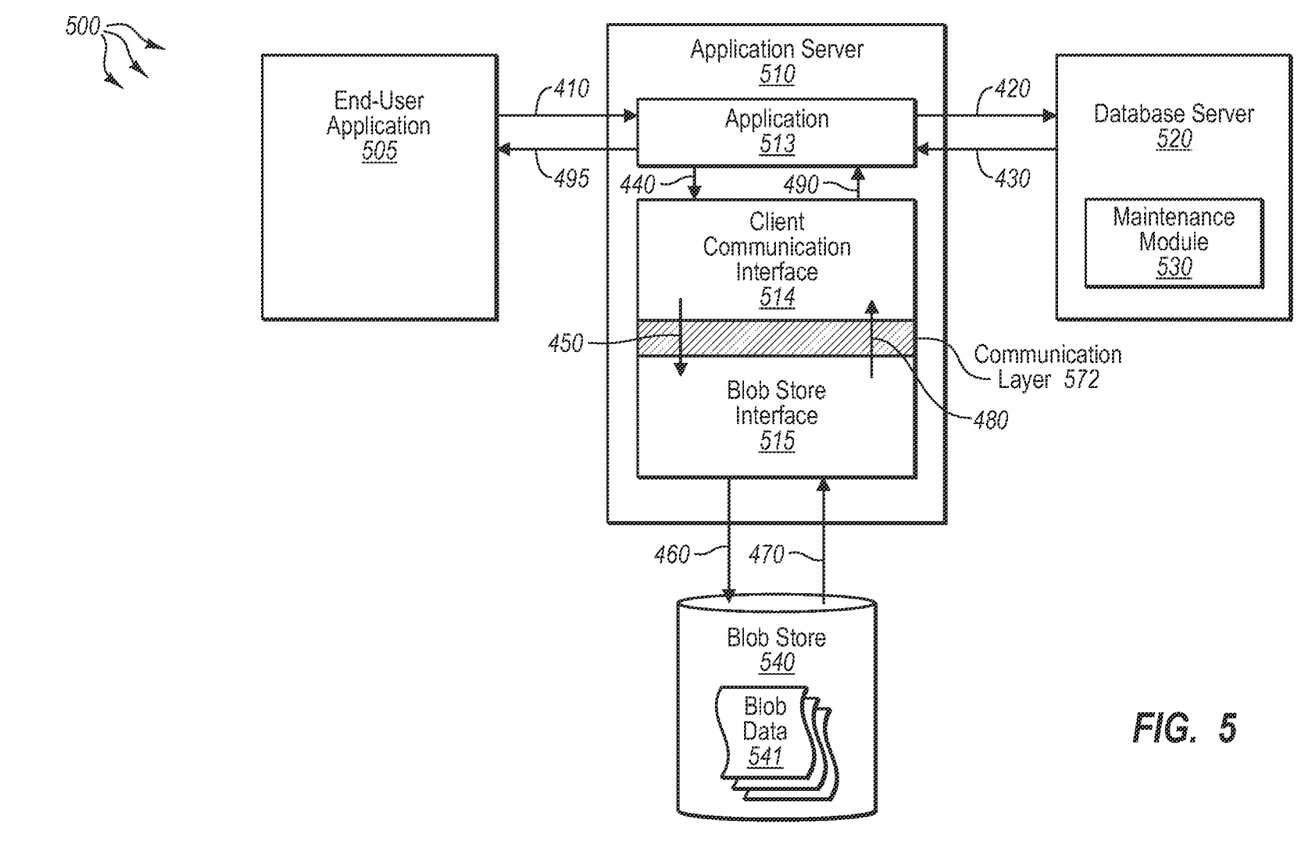
FIG. 5 illustrates a computer architecture of an alternative embodiment in which embodiments of the present invention may operate.

FIG. 5 illustrates a computer architecture of an alternative embodiment in which embodiments of the present invention may operate. FIG. 4 illustrates a flowchart of a method 400 for accessing remotely stored blob data in the blob store. The method 400 will now be described with frequent reference to the components and data of environment 500 of FIG. 5.

Method 400 includes an act of receiving at an application server a request for a portion of blob data (act 410). For example, as depicted in act 410 of FIG. 5, application server 510 (which may be the same as or similar to application server 110) may receive a request for a portion of blob data from end-user application 505.

Method 400 includes an act of sending a query to a database server requesting access to the blob data (act 420). For example, application server 510 may send a query to database server 520 (including maintenance module 530) requesting access to the blob data. In some cases, the blob data may have been previously sent to blob store 540 for storage, and an identifier or reference may have been created by database server 520 and stored for future reference to the blob.

Method 400 includes an act of receiving a blob reference, the blob reference including blob identification data and one or more use characteristics specific to the blob store (act 430). For example, application server 510 may receive a blob reference that includes blob identification data and various use characteristics specific to the blob store. In some cases, these characteristics may include a provider-specific ID that matches or corresponds to the identifier produced by database server 520.

Method 400 includes an act of passing the received blob reference to a client communication interface configured to communicate with a blob store interface (act 440). For example, application 513 (which may be an instance of end-user application 505) may pass the received blob reference to client communication interface 514. Interface 514 may be configured to communicate with blob store interface 515. In some embodiments, client communication interface 514 may be a library that is called by application 513 to communicate with and send the reference to blob store interface 515. The communication may occur directly or over communication layer 572. Thus, at least in some embodiments, interfaces 514 and 515 may be on different computer systems, which may be separate from application server 510.

Method 400 includes an act of passing the blob reference from the client communication interface to the blob store interface, the blob store interface being configured to interpret blob references and request blob data from the blob store according to the use characteristics of the blob store (act 450). For example, the blob reference received from database server 520 may be passed to blob store interface 515 which is configured to interpret blob references and request blob data from blob store 540 according to the use characteristics of blob store 540. In some cases, the provider specific ID generated by database server 120 and encoded in blob reference 136 may be used to select the blob store interface to pass the reference to. This allows having multiple blob store interfaces 515 connected to the client 514 all communicating with a common communications layer 572.

As explained above, blob store 540 may include any type of storage system, including proprietary storage systems. Such systems may have their own protocols, file storage formats and other unique characteristics that do not naturally interface directly with database server 520 or application server 510. Thus, blob store interface 515 may be used to facilitate data transfer between application server 510 and blob store 540. Similar to client communication interface 514, blob store interface 515 may be a library called by application server 510 to facilitate the aforementioned intercommunication.

Method 400 includes an act of sending a blob data access request based on the identification data in the blob reference using the blob store interface (act 460). For example, a blob data access request generated by database server 520 may be sent to blob store 540 based on the identification data in the blob reference, using the blob store interface. For example, blob store interface 515 may interpret the identification data in the blob reference in a manner understood by blob store 540.

Method 400 includes an act of receiving the blob data corresponding to the blob data access request at the blob store interface, the blob data comprising a portion of one or more data files (act 470). For example, blob store interface 515 may receive blob data 541 from blob store 540, where blob data 541 corresponds to the blob data identified in the request. The blob data includes at least a portion of one or more data files requested by end-user application 505. In some embodiments, client communications interface 514 may be responsible for joining multiple binary objects stored as separate blob data files in blob store (or blob stores) 540 into a single binary stream and causing that stream to appear to application 513 as a single unbroken binary object. Application 513 may pass a single blob reference to client 514 which interprets the single blob reference as referring to multiple binary objects stored in one or many blob stores (e.g. blob store 540).

Method 400 includes an act of passing the received blob data from the blob store interface to the client communication interface (act 480). For example, blob store interface 515 may pass the blob data received from blob store 540 to client communication interface 514. As explained above, communication layer 572 may facilitate communication between the two interfaces.

Method 400 includes an act of passing the received blob data to the application server (act 490). For example, client communication interface 514 may pass the received blob data to application 513 of application server 510.

Lastly, method 400 includes an act of sending the received blob data to the user (act 495). For example, application server 510 may send the received blob data to the user via end-user application 505. All of the above embodiments including data consistency maintenance, security and authentication, and the use of other components may also apply in like manner to environment 500 and corresponding method 400.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for reducing processing loads in order to increase data transfer rates of a database server, wherein the database server responds to requests for data from an application server, and wherein the database server maintains references to binary objects stored within a binary object store that is separate from the database server, the method comprising:
   an application server receiving a request from a user for a portion of binary object data;
   the application server sending a query to the database server requesting access to the binary object data, wherein the database server maintains a reference to the binary object which is remotely stored in a binary object store which is separate from the database server;
   the application server receiving from the database server the binary object reference, the binary object reference including binary object identification data and use characteristics specific to the binary object store, wherein the use characteristics include a data storage format of the binary object store and data access protocols for accessing data at the binary object store such that the application server may access binary object data from a plurality of binary object stores each having distinct data storage formats and data access protocols;
   rather than requiring the database server to retrieve the binary object data, the application server sending a binary object data access request based on the binary object reference and the use characteristics directly to the separate binary object store using a binary object store interface, wherein the binary object store interface interprets the use characteristics to communicate with a particular binary object store using a particular data storage format and data access protocol among the plurality of distinct data storage formats and data access protocols;
   the application server receiving from the binary object store the binary object data corresponding to the binary object data access request, the binary object data comprising a portion of one or more data files and wherein the application server did not need to interpret the particular data storage format and data access protocol; and
   the application server sending the received binary object data to the user.

2. The method of claim 1, further comprising storing binary object data in at least one of a plurality of binary object stores, each binary object store comprising at least one of a plurality of binary object store types, each binary object being immutable.

3. The method of claim 1 wherein the binary object identification data identifies which particular binary object store of a plurality of binary object stores the binary object is located in.

4. The method of claim 1, wherein binary object references are stored in application tables on the database server.

5. The method of claim 1, further comprising requesting a plurality of binary object references in the same request.

6. The method of claim 1, further comprising receiving binary object locator information, the binary object locator information comprising location information that allows an application server in a multi application server environment to access and receive binary object data directly from the binary object store.

7. The method of claim 1, further comprising:
   an act of determining that a data file is to be stored on the database server, the data file including at least a portion of binary object data and a portion of associated metadata;
   an act of separating the binary object data from the portion of associated metadata;

an act of storing the binary object data in the binary object store, the binary object data being linked to the associated metadata stored on the database server.

8. The method of claim 1, further comprising:
an act of receiving authentication credentials corresponding to the user; and
an act of integrating both the received the binary object reference and the authentication credentials into a software object for secure access to the binary object data from the binary object store.

9. A computer program product comprising one or more computer-readable hardware storage devices having encoded thereon computer-executable instructions which, when executed upon one or more computer processors, performs a method for an application server to access binary object data which is remotely stored in a binary object store, wherein a database server which maintains references to binary objects stored within the binary object store is separate from the binary object store thereby separating the burden of interpreting data requests and accessing data, the method comprising the method of claim 1.

10. The method of claim 3, further comprising:
an act of sending a second request to the database server for a binary object store-specific binary object ID;
an act of receiving a binary object store-specific binary object ID from the database server.

11. The method of claim 8, wherein the binary object data access request is based on the authentication credentials and identification data in the binary object reference.

12. The method of claim 8, wherein binary object store authentication is managed by at least one of an operating system, a software application and the data server.

13. The method of claim 11, wherein the binary object data is accessible by the database server using the authentication credentials and identification data.

14. A method for an application server to access binary large object (blob) data which is remotely stored in a blob store, wherein a database server which maintains references to blobs stored within the blob store is separate from the blob store thereby separating the burden of interpreting data requests and accessing data, the method being performed in a computer system in a computer networking environment including the application server, the database server, a client communication interface, a blob store interface and the blob store, the method comprising:

an application server receiving from a user a request for a portion of blob data
the application server sending a query to the database server requesting access to the blob data, wherein the database server maintains a reference to the blob data which is remotely stored in a blob store which is separate from the database server;
the application server receiving a blob reference from the database server, the blob reference including blob identification data and one or more use characteristics specific to the blob store, wherein the use characteristics include each of a data storage format of the blob store and a proprietary data access protocol for accessing data at the blob store such that the application server may access binary object data from a plurality of blob stores each having distinct data storage formats and data access protocols;
the application server passing the received blob reference to a client communication interface configured to communicate with a blob store interface;
passing the blob reference from the client communication interface to the blob store interface, the blob store interface being configured to interpret blob references and request blob data directly from the blob store according to the use characteristics of the blob store, wherein the blob store interface interprets the use characteristics to communicate with a particular blob store using a particular data storage format and data access protocol among the plurality of distinct data storage formats and data access protocols;
sending to the blob store a blob data access request based on the identification data in the blob reference using the blob store interface and using the proprietary data access protocol;
receiving from the blob store the blob data corresponding to the blob data access request at the blob store interface, the blob data comprising a portion of one or more data files;
passing the received blob data from the blob store interface to the client communication interface;
passing the received blob data to the application server; and
the application server sending the received blob data to the user.

* * * * *